March 10, 1970 — G. E. MINNICH ET AL — 3,500,439
SIMULATION OF RADIO NAVIGATION EQUIPMENT
Filed May 1, 1968 — 2 Sheets-Sheet 1

INVENTOR.
GEORGE E. MINNICH
LYNN A. STAPLES

*William Grobran*

March 10, 1970 G. E. MINNICH ETAL 3,500,439
SIMULATION OF RADIO NAVIGATION EQUIPMENT
Filed May 1, 1968 2 Sheets-Sheet 2

*INVENTOR.*
GEORGE E. MINNICH
LYNN A. STAPLES

*William Grobman*

United States Patent Office 3,500,439
Patented Mar. 10, 1970

3,500,439
SIMULATION OF RADIO NAVIGATION
EQUIPMENT
George E. Minnich, Vestal, and Lynn A. Staples, Greene,
N.Y., assignors to General Precision Systems Inc.,
Binghamton, N.Y., a corporation of Delaware
Filed May 1, 1968, Ser. No. 725,706
Int. Cl. G09b 9/00
U.S. Cl. 35—10.2
18 Claims

ABSTRACT OF THE DISCLOSURE

The system of this invention simulates the operation of radio navigation gear. Specifically, the system simulates a Visual Omnirange System and an Instrument Landing System. Notched square waves are used as reference and phase-shifted signals to reduce the harmonics and the required filtering. Choppers serve to modulate input signals to produce a resultant sine wave that has the desired amplitude and phase shift. A reference sine wave is phase split and the four quadrature components are combined in a linear potentiometer. The resultant output from the potentiometer represents the direction of the aircraft from the radio beacon. This is then compared with the phase-shifted signal and a null is achieved by means of the potentiometer to indicate the aircraft radial from the transmitter. The reference chopper is used in ILS mode to generate a signal representative of the heading of the runway. The variable phase chopper generates signals representative of the glide slope by using the ground range and the altitude of the aircraft. These signals are used to control an ILS chopper which produces the signals to operate aircraft type instruments.

---

This invention relates to electronic devices and, more particularly, to electronic devices which simulate the operation of radio navigation equipment.

Training devices which simulate the operations of the machines for which the training is intended are being used with increasing frequency as the complexity of modern equipment increases. Vehicles, for example, are becoming more complex and expensive all the time. Tanker ships have never been larger nor have aircraft. In addition, these machines contain expensive control and navigation equipment. Automatic control equipment for factories, oil refineries, food processing plants, and the like, is becoming more common and more complex. In all of these examples improper operation of the equipment will result not only in damage to the equipment but will often cause damage and injury to other apparatus, supplies and persons of greater value than the value of the damage to the misused equipment itself. Simulators, devices which simulate the operation of an apparatus or system, are very useful training devices because they can simulate dangerous or emergency conditions without actually endangering anything or anyone.

The simulation of aircraft operation is not new, and as the types of aircraft and the equipment contained therein changes, the aircraft simulators also change. One important device which is often simulated in aircraft training devices is the radio navigation gear. The proper operation of such gear is important in aircraft navigation. In a general purpose aircraft trainer, the simulation of the more common radio navigation equipment only is simulated. In specialized training systems, special navigation gear may also be simulated. This specification describes equipment for simulating the more common radio navigation devices used in modern aircraft.

It is an object of this invention to provide new and improved electronic equipment.

It is another object of this invention to provide a new and improved electronic device for simulating the operation of radio equipment.

It is a further object oft his invention to provide a new and improved electronic device for training purposes.

It is still another object of this invention to provide a new and improved apparatus for simulating radio navigation equipment in common use.

Other objects and advantages of this invention will become more apparent as the following description proceeds, which description should be considered together with the accompanying drawings in which.

Figure 1:
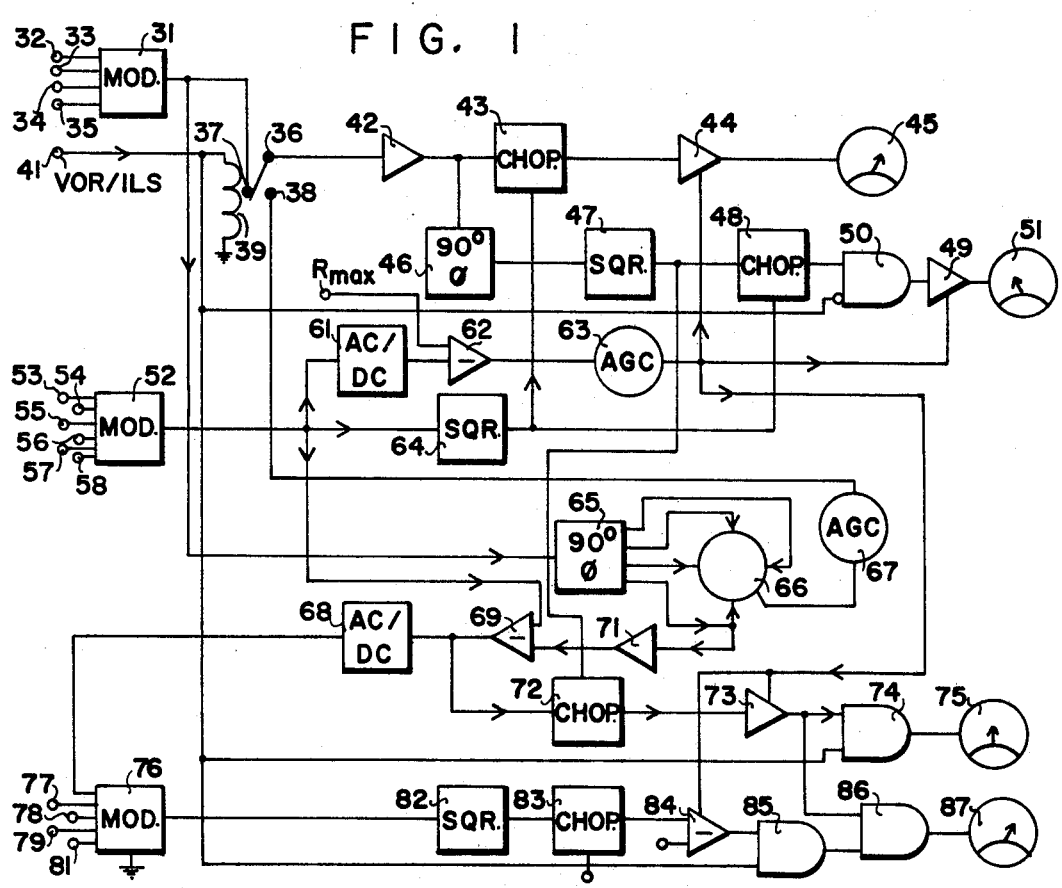
FIG. 1 is a functional block diagram of the system according to this invention.

Referring now to the drawings in detail and more particularly to FIG. 1, the reference character 31 designates a modulator and filter having several input terminals. The modulator, as discussed in greater detail below in the description of FIG. 4, comprises a sine and a cosine chopper. Therefore, two input or control signals are used to control the choppers. The chopper operating potentials are the sin ($n$) signal applied to terminal 33 and cos ($n$) signal applied to terminal 34. A DC voltage proportional to the angle is applied to the terminals 32 and 35 with sin $\psi$ being applied to terminal 32 and cos $\psi$ applied to terminal 35. The output from the modulator 31 is a sine wave whose phase is proportional to the angle $\psi$, whose amplitude is proportional to $\sqrt{\sin^2 \psi + \cos^2 \psi}$ and whose frequency is that of the signal ($n$). The output from the modulator 31 is applied to a stationary contact 37 of a double-throw, single pole switch which has a movable contact 36 and another stationary contact 38. The movable contact 36 is connected to the input of an amplifier 42, the output from which is applied to a chopper 43 wherein it is chopped and applied through an amplifier 44 to a VOR indicator 45. The outut from the amplifier 42 is also applied through a quadrature phase shifter 46 and a squaring amplifier 47 to an input of a chopper 48, the output from which is amplified by an amplifier 49 and is applied to a TO-FROM indicator 51.

The output from the modulator 31 is also applied to the input of a quadrature phase splitter 65 which has four outputs, each 90° shifted from an adjacent output. The four outputs are applied to four equally spaced separate inputs to the resistance element of a linear potentiometer 66. The resultant output from the potentiometer 66 is applied through an automatic gain control circuit 67 to the other stationary contact 38. The position of the movable contact 36 is controlled by a coil 39 which is energized by a signal applied to an input terminal 41.

A second modulator filter 52 also has a plurality of inputs. The chopper control signals are applied to two of the terminals, sin $(n)$ being applied to terminal 57 and cos $(n)$ being applied to terminal 58. Of the remaining four terminals, terminal 53 has applied to it the X coordinate of the aircraft and terminal 55 has the Y coordinate of the aircraft while terminal 54 has the X coordinated and terminal 56 has the Y coordinate of the ground station applied to them.

The output from the modulator and filter 52 is applied to the input of an AC-to-DC converter 61 whose output supplies one input to a differential operational amplifier 62. The output of the amplifier 62 is applied to an automatic gain control circuit 63 whose output is used to control the gain of the amplifiers 44 and 49. In addition, the output from the modulator and filter 52 is applied to a squaring amplifier circuit 64 which controls the operation of choppers 43 and 48. The output from the modulator and filter 52 is also applied as one input to a summing operational amplifier 69 the other input to which comes from the zero phase output of the phase splitter 55 applied through an amplifier 71. The output of the operational amplifier 69 applies a signal through an AC-to-DC converter 68 to one input of a modulator chopper 76 and also applies an input to a chopper 72 which applies a signal through an amplifier 73 to one input of a gate 74. The output of the gate 74 supplies an input to an indicator 75 which indicates whether or not the glide slope equipment is on or off. The VOR/ILS signal applied to the input terminal 41 to control the coil 39 is also applied as the other input to the gate 74 and as one input to a gate 85. The third modulator filter 76 has applied to its other inputs the chopper control signals; sin $(n)$ is applied to terminal 77 and cos $(n)$ is applied to input terminal 81. In addition, the altitude of the aircraft is applied to the input terminal 78 and the elevation of the field is applied to the input terminal 79. The output of the modulator 76 is applied as an input to a squaring amplifier circuit 82 whose output is applied to a chopper 83. The output of the chopper 83 is applied as one input to a differential amplifier 84, the other input to which comes from a 400 cycle generator. From the amplifier 84 the output is applied as the other input to the gate 85 which supplies one input to a gate 86, the other input to which comes from the output of the amplifier 73. The output of the gate 86 is applied to a glide slope instrument 87 which indicates the vertical deviation from that glide slope which properly places the receiving aircraft on the ground at the right spot.

The system of FIG. 1 simulates two important types of radio navigation equipment found in many aircraft. As seen from the legend along side the input terminal 41, the system shown in FIG. 1 will simulate both VOR and ILS. VOR is, of course, the Visual Omnirange system which comprises a ground station transmitting two different signals. One of the two signals is a reference signal and the other signal is one whose phase varies continually and smoothly with the angular distance around the beacon from North. These two signals are received by an airplane which is in the vicinity, and they are compared by the equipment in the aircraft to derive a voltage which is proportional to the direction of the aircraft from the beacon. This is indicated on instruments in the aircraft as the angular radial from the beacon which interests the aircraft. ILS is the Instrument Landing System which comprises a ground station having transmitter antennas adjacent to a touchdown point on a runway. The antennas have two radiation patterns which comprise two lobes each, two horizontal and two vertical. The vertical lobes are propagated at an angle with the horizonal known as the glide slope. These two lobes indicates to the pilot in an approaching aircraft when he is riding the center of the two lobes and therefore a proper glide path, and when he deviates from that path. The two horizontal lobes, which are occasionally not present in some systems, indicate to the pilot when he is or is not "on course." The system of FIG. 1 simulates the operation of both of these systems.

To simulate the two signals which are required for each part of the systems being simulated, a modulator and filter is used to control the parameters of each signal. Each of the modulators 31, 52 and 76 comprises a pair of choppers, one chopper of each pair being known as the sine chopper and the other the cosine chopper. Each chopper utilizes its sine or cosine alternating current signals to produce the chopper effect upon a DC voltage whose amplitude is proportional to the parameter or value being simulated. Thus, considering the modulator 31, the sin $(n)$ and cos $(n)$ signals are the operating signals for the chopper which divides a direct current potential into pulses. As shown on FIG. 1, the modulator and filter 31 has four inputs of which two are the chopper control signals. The other two inputs are the direct current potentials which are proportional to the value being simulated therein. Thus, the signal applied to input terminal 32 is a direct current potential proportional to the sine of the angular distance from North of the radial being simulated, and the input to the terminal 35 is a direct current potential proportional to the cosine of the same angle. Each half of the chopper serves to divide one of these potentials. The control potentials sin $(n)$ and cos $(n)$ are mutilated square waves. Square waves are used in a precision device of this type because their cross-over points, their zero phase points, are more readily recognizable and can be determined with greater accuracy than the cross-over points of sine waves. Since the system works primarily on sine waves, however, the square wave output from the modulator is converted into a sine wave This requires substantial filtering. To reduce the size and complexity of the required filter, a mutilated square wave is used. Square waves contain only odd harmonics. The square wave used in this system is "notched" which removes or greatly reduces the amplitude of the third and the fifth harmonics. This means that the first harmonic present after the fundamental is the seventh harmonic, and this harmonic is usually of such a small amplitude that comparatively small amount of filtering is required to eliminate it and the other higher harmonics. So, the output from each of the modulators 31, 52 and 76 is a sine wave whose amplitude is proportional to the quantity being simulated, whose frequency is proportional to the frequency of the control signals, and whose phase is proportional to the angular quantity being represented.

The signal applied to input terminal 41 is a DC potential which energizes the coil 39 to place the movable contact 36 into either one of its two positions. When VOR is being simulated, the movable contact 36 is in position to complete a circuit with the stationary contact 38. The output from the modulator 31 is then applied to the quadrature phase splitter 65 which produces four output signals each shifted 90° from the adjacent one. Actually, however, the phase of each of these quadrature signals with respect to a reference or other signals can be varied as the phase of the output from the modulator 31 varies. In VOR simulation, the modulator 31 is used as a reference generator so that the signal output from that modulator is, in a sense, zero degrees or unshifted. The modulator 52 has applied to it in addition to the control signals sin $(n)$ and cos $(n)$ two pairs of DC potentials. One pair of DC potentials applied to the modulator 52 is applied to the input terminals 53 and 55 and the other pair is applied to the input terminals 54 and 56.

The present discussion is an explanation of the operation of the systems to simulator VOR. It is assumed that the six signals being applied to the modulator 52 are the two control signals applied to input terminals 57 and 58 and the two signals applied to terminals 53 and 55 representing the coordinates of the aircraft and the two signals applied to 54 and 56 representing station location. The output from the modulator 52 is similar to the output from the modulator 31, a sine wave whose amplitude is proportional to the DC potentials representative of the aircraft coordinates and whose frequency is proportional to the frequency of the control signals. The output from the modulator 52 is applied through a squaring circuit 64 to the inputs to two choppers 43 and 48. The quadrature signals from the phase splitter 65 are applied at 90° intervals to the resistance element of the linear potentiometer 66. Thus, there are four signals being applied to four points on a circular resistance element. The slide of the potentiometer 66 receives a resultant signal which is proportional to the combination of the four applied signals and to the position of the slide itself. This resultant signal is applied through an automatic gain control circuit 67 and the contacts 38 and 36 to the input of the amplifier 42. The output from the amplifier 42 is directly applied as another input to the chopper 43. The chopper 43 effectively combines the signal outputs from the potentiometer 66 (which originally came from the modulator 31) and the output from the modulator 52. The signal from the modulator 52 which is applied to the chopper 43 is fixed, but that from the potentiometer 66 can be varied by changing the position of the slide. Thus, when the slide of the potentiometer 66 is moved until the point is reached where the two signals effectively null each other in the chopper 43, this output is applied through the amplifier 44 to the meter 45 which indicates the null point. The reading of the radial from the radio tower to the aircraft can be taken from a dial on the potentiometer 66. The output of the amplifier 42 is also applied to a second channel which includes the chopper 48. The signal from the amplifier 42 is shifted 90° by a phase shifter 46, and it is then squared in the squaring circuit 47 from which it is applied to the chopper 48. This is the variable signal from the potentiometer 66. The fixed signal from the modulator 52 is applied to the other input of the chopper 48 through a squarer 64. The output of the chopper 48 is applied through an amplifier 49 to a center-reading meter 51. As the aircraft passes the ground transmitter beacon, the meter 51 indicates whether or not the aircraft is approaching or leaving the antenna. The meter also has an OFF position to show when the aircraft is out of range of a VOR station. The OFF position of the indicator 51 is controlled by means of the amplifier 49 which has a gain control signal applied to it from the circuit 63. The maximum range of any particular station is inserted into one input of a differential amplifier 62 and the other input to the amplifier 62 is applied from the modulator 52 through an AC-to-DC converter 61. So long as the maximum range potential is less than that supplied by the modulator 52, the gain of the amplifier 49 is reduced to cut off. When, however, the aircraft comes within such a distance of the ground station that the output from the modulator 52 is less than the maximum range of the receiver, the output from the amplifier 62 changes and the amplifier 49 is turned on.

When the input terminal 41 receives a signal representing ILS, the movable contact 36 is positioned against the stationary contact 37, enabling signals are applied to the gates 74 and 85, and an inhibiting signal is applied to gate 50. The output of the modulator 31 is a sine wave whose amplitude represents the length of the runway and whose phase represents the heading of the runway. A discussion of the operation of the system of FIG. 1 on instrument landings is made with reference to FIG. 2.

Figure 2:
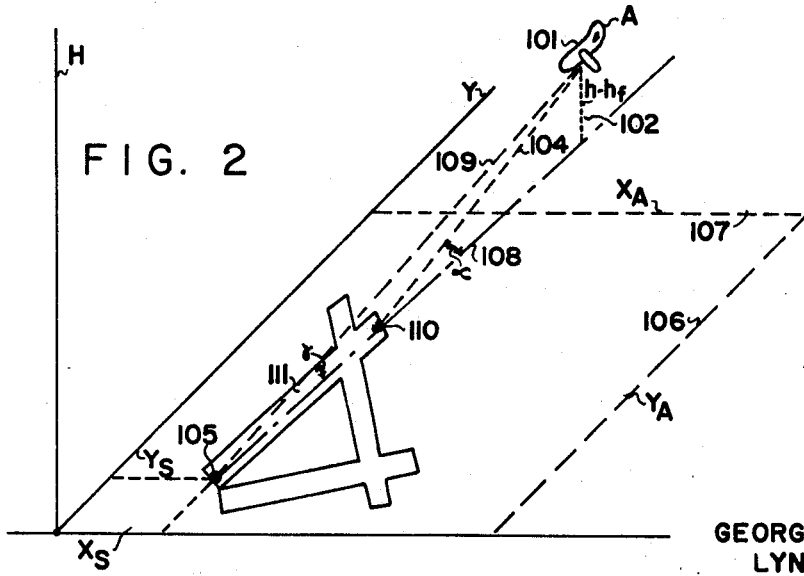
FIG. 2 is a diagram illustrating an aircraft's approach to a runway.

In FIG. 2 the aircraft A is shown at 101, the touchdown point 110 is at one end of the runway 111, and the localizer transmitter is at the other end 105 of the runway 111. The altitude of the field is $h_f$ and the altitude of the aircraft 101 is $h$. Therefore, the elevation 102 of the aircraft 101 above the field is $h-h_f$. The coordinates of the aircraft are shown as $X_A$ 107 and $Y_A$ 106. Similarly, the coordinates of the runway are those of the localizer point 105 and are $X_S$ and $Y_S$. The aircraft 101, at an altitude $h$, is proceeding along the same heading as that of the runway 111 and must glide in on an angle such that its wheels touch ground at the point 110. The glide slope angle is shown as $\alpha$ and is the angle between the line 104 between the aircraft 101 and the touchdown point 110 and the horizontal projection 103 of that line 104. The angle between the line 109 from the aircraft 101 to the localizer point 105 and the horizontal projection 108 of that line 109 is $\gamma$.

In FIG. 1, during ILS operation the modulator 31 provides the reference values. The output of the modulator 31 is a sine wave whose amplitude is proportional to the length of the runway 111 and whose phase is proportional to the heading of the runway 111. For ILS, everything is referred to the runway as a datum. The modulator 52 produces a sine wave whose amplitude is proportional to the length of the line 108. The output from the modulator 31 is applied to the phase splitter 65 which supplies a zero phase signal representative of the runway length through amplifier 71 to one input to differential amplifier 69. The other input to the amplifier 69 is applied thereto from the output of the modulator 52. The output from the amplifier 69 is the length of the line 108 less the length of the runway 111, and is equal to the length of the line 103, or the range from the aircraft 101 to the touchdown point 110. The AC output from the amplifier 69 is converted into DC by the AC-DC converter 68 which applies the DC output as one input to the modulator 76. In addition to the chopper control potentials, sin $(n)$ and cos $(n)$, applied to terminals 77 and 81, a DC potential proportional to the altitude $h$ of the aircraft 101 is applied to terminal 78 and a DC potential proportional to the field elevation $h_f$ is applied to terminal 79. The modulator 76 differentially combines the aircraft altitude $h$ and the field elevation $h_f$ to produce the elevation 102 of the aircraft 101 above the field, $h-h_f$. The elevation 102 is combined with the output of the converter 68 (line 103) to produce a sine wave output from the modulator 76 which has an amplitude proportional to the length of the line 104 and a phase proportional to $\alpha$. This sine wave is applied to a squaring circuit 82 which, in turn, applies a signal to a chopper 83. The chopper 83 has a 400 cycle wave applied to it also, and its output, which has a frequency of 400 cycles and an average value proportional to the slope of line 104, is applied as an input to a differential amplifier 84. The other input to the amplifier 84 is a signal proportional to the glide slope $\alpha$. Since this is fixed for any installation, it remains the same during an approach. When the slope of the line 104, applied as one input to amplifier 84, is the same as the glide slope, applied as the other input to amplifier 84, the output from the amplifier 84 is at a zero value and is transmitted through the two gates 85 and 86 to the up-down indicator 87. Should the slope of line 104 vary either up or down from the value equal to the glide slope, the output from the amplifier 84 varies accordingly, and this is indicated by the indicator 87. As mentioned above, so long as the apparatus of FIG. 1 is being used for ILS, a signal applied to the input terminal 41 is also applied to the gate 85 to open that gate.

The output from the differential amplifier 69 is also applied to a chopper 72, which also receives an input from a squaring circuit 47 which receives its signal from the modulator 31 through a 90° phase shifter 46. The output from the squarer 47 represents the bearing of the runway 111 shifted through 90°. When this signal is applied to the chopper 72 together with the signal which represents the bearing of the line 103, chopper 72 produces an output which passes through the amplifier 73 and the gate 74, when it is open, to provide the indicator 75 with a signal which is displayed as ILS ON. The gain control for the amplifier 73 is derived from the gain control circuit 63. The output from the converter 61, which is a DC voltage representative of the length of the line 108, decreases as the aircraft 101 approaches the touchdown point 110. When the phase of the signal from 69 is between 180° and 360° from the phase of the signal from 47, the output from the amplifier 102 becomes negative, cutting off the amplifier 73. With no signal from the amplifier 73, the gate 74 remains closed and the indicator 75 indicates OFF.

Figure 3:
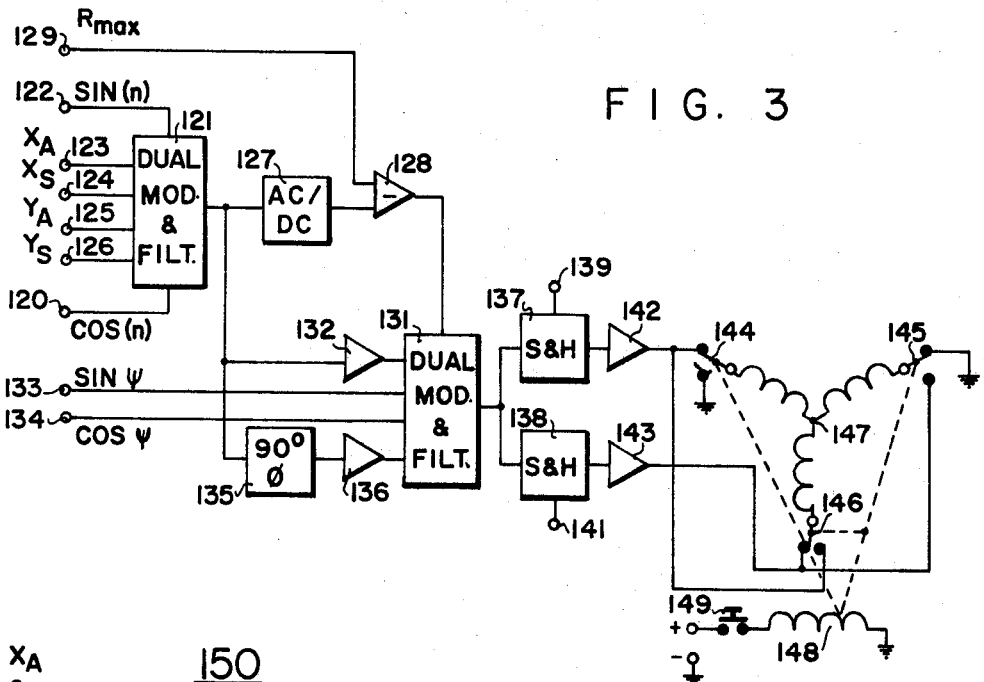
FIG. 3 is a functional block diagram of an ADF receiver simulator according to this invention.

This invention also includes a system for simulating ADF (Automatic Direction Finding). The ADF portion of the system is illustrated in FIG. 3 in which a modulator and filter 121, similar to that shown in detail in FIG. 4, has a plurality of input terminals. Rectangular waves having a reference or zero phase are applied to terminal 122 and rectangular waves having a quadrature phase are applied to terminal 120 as modulator control signals. A voltage proportional to the X coordinate of the aircraft 101 is applied to terminal 123, and a voltage proportional to the Y coordinate of the aircraft is applied to terminal 125. Similarly, a voltage proportional to the X coordinate of the ground station (transmitter) 105 is applied to terminal 124 and a voltage proportional to the Y coordinate of the ground station is applied to terminal 126. The output of the modulator and filter 121 is a sine wave whose amplitude is proportional to the range of the aircraft from the ground station and whose phase difference from the reference signal applied to terminal 122 is proportional to the bearing angle from the aircraft to the station. This sine wave is applied directly to an open-loop amplifier 132 and through a 90 degree phase shifter 135 to another open-loop amplifier 136. The two outputs from the amplifiers 132 and 136 are applied as quadrature signals to the inputs of another modulator and filter 131. The modulator 131 also has a voltage proportional to the sine of the aircraft heading angle applied to terminal 133 and a voltage proportional to the cosine of the aircraft heading angle applied to terminal 134. The output from the modulator 131 is a sine wave whose amplitude is constant and whose phase with respect to the reference signal applied to terminal 122 is proportional to the difference between the bearing angle of the aircraft to the station and the heading of the aircraft. This output from the modulator 131 is applied to two sample and hold circuits 137 and 138. The sampling voltage controlling the sample and hold circuit 137 is an alternating zero phase signal applied to input terminal 139, and the sampling pulse train controlling the circuit 138 is applied to input terminal 141 and occurs 60 degrees after the signal applied to terminal 139. The output from the circuit 137 is applied through an amplifier 142 to one arm of a meter 147, and the output of the circuit 138 is applied through an amplifier 143 to another arm of the same meter. The meter 147 comprises an instrument which has a permanent magnet rotor (not shown in this drawing to avoid unnecessary clutter) and a three-phase field. The three-phase field comprises three coils whose centers are physically located 120 degrees apart around the circumference of the instrument. The three windings of the instrument 147 are Y connected and their free ends are each shown connected to a movable contact of one of the three switches 144, 145 and 146. The switches 144, 145 and 146 are controlled by a relay coil 148 which is activated by closing a momentary switch 149. Each of these three switches includes a pair of stationary contacts. One stationary contact of switch 144 is grounded and the other is connected to the output of the amplifier 142, which is also connected to one of the stationary contacts of switch 146. The other stationary contact of switch 146 is connected to the output of the amplifier 143, which is also connected to one of the stationary contacts of the switch 145, the other stationary contact of which is grounded. When the relay coil 148 controlling the contacts 144, 145 and 146 is energized, the needle will move 120° counterclockwise if a station is tuned. This gives the pilot an indication of the strength of the tuned signal.

The output of the modulator 121 is also applied to an AC-to-DC converter 127. The output of the converter 127 is applied as one input to a differential amplifier 128, and the second input to the amplifier 128 is supplied from an input terminal 129. To the terminal 129 is supplied a voltage which is proportional to the maximum range of the particular ground transmitter being simulated at the moment. The output of the amplifier 128 is applied as an input to the modulator 131 to control the operation of that modulator.

The system shown in FIG. 3 simulates an automatic direction finding system. Operational ADF systems on board aircraft receive a radio transmission from a ground station. The aircraft antenna is usually a directional antenna such as a modified loop antenna which has a cardioid reception pattern, a closed loop antenna which operates on a phase variation, or similar types. The antenna system is connected to a servo device which drives the antenna in rotation until the maximum signal strength is reached. At that point the servo system stops and a pointer, mechanically connected to the antenna itself, indicates the bearing of the transmitter with respect to the nose of the aircraft. To simulate this system, information from the flight computer and similar sources in the aircraft simulator is applied to the inputs of the modulator 121. In a simulated flight of the aircraft 101, the simulated geographic area over which the flight takes places is defined at the begining of the mission. This would include the stations which the aircraft approaches. As part of this identification, a voltage proportional to the maximum range of the ground transmitter at that airport is developed and applied to the input terminal 129. Similarly, both the starting position of the aircraft itself and the X–Y coordinates of the stations are identified and selectively applied to the inputs of the modulator 121 by any suitable selective device known in the art. These signals can be inserted by an instructor who controls the settings of potentiometers and the like, or, more generally, by information stored in the memory of the simulator computer. The signals applied to the input terminals 120 and 122, as will be explained below in detail, are notched square waves. The notching, or mutilation, of the square waves result from the elimination of the third and fifth harmonics from the harmonic content of the signal. Since the square waves contain all odd harmonics, the strongest harmonic above the fundamental which remains after notching is the seventh harmonic, and this is sufficiently weak to require a minimum amount of filtering to remove. Filtering is necessary to develop the sine wave which is the output of the modulator 121.

The modulator 121 is a switching device having two separate parts. The rectangular waves applied to terminals 120 and 122 cause the respective parts of the modulator to become alternately conductive and non-conductive. In addition, when one-half of the modulator conducts during one-half of its conduction time, it acts as a switch permitting the aircraft coordinate voltage to pass to its output, and during the other half of its conduction time it permits the ground station coordinate voltages to be connected to the output. The result is a sine wave output whose amplitude is proportional to the range (or the distance between the aircraft and the ground station) and whose phase angle with respect to the signal applied to the input terminal 122 is proportional to the bearing angle from the aircraft to the ground station. This signal is converted to a DC level by the converter 127, and the voltage from the converter 127 is applied to one input of the difference amplifier 128. The other input to the amplifier 128 is the voltage which is applied to the input terminal 129 representing the maximum range of the ground station. When the signal output from the converter 127 is greater than that of the signal applied to terminal 129, the output from the amplifier 128 effectively blocks the operation of the modulator 131. When, however, the aircraft approaches the ground station sufficiently closely that the signal representative of the range between the two (the output from the converter 127) becomes equal to or less than the signal representing the maximum range of the ground station, the output signal from the amplifier 128 permits the modulator 131 to operate. In this manner, when the simulated aircraft is out of the range of the simulated ground station transmitter, the ADF does not operate.

Since the output from the modulator 121 is applied directly and in quadrature to the second modulator 131, it serves as the modulator control voltage. Two other inputs to the modulator 131 are the DC voltages which represent the sine and the cosine of the heading angle of the aircraft and which modulate the sine control wave. The modulator 131, which is similar to the modulator shown in FIG. 4, produces an output sine wave which has a constant amplitude and a phase which varies with the difference between the heading angle of the aircraft and the bearing angle between the aircraft and the ground station. The output from the modulator 131 is applied to the inputs of two sample and hold circuits 137 and 138 which sample the sine output from the modulator 131 at different times. The circuit 137 samples the sine wave when the reference signal, that applied to the input terminal 122, is at zero phase and the circuit 138 samples the output of modulator 131 at a time when the reference signal applied to terminal 122 is at an angle of 60 degrees. The outputs of the two sample and hold circuits 137 and 138 are applied to two separate windings of the three-phase field of the indicator 147. The third winding of that field is grounded. This means that only two of the three windings are energized, and the third winding serves as a reference winding. The actions of the sample and hold circuits 137 and 138 are to develop DC voltages proportional to the average voltage of the alternating current output from the modulator 131 at the times when this alternating current is sampled. The sampling signals are related to the zero or reference signal which is applied to the input terminal 122, and once these sampling pulse times are determined, they remain fixed. However, as mentioned above, the output from the modulator 131 has a phase angle which is proportional to the bearing from the aircraft to the ground station when compared with the reference signal applied to the terminal 122. As the bearing from the aircraft to the ground station changes, so does the relative phase of the output from the modulator 131 and of the sampled portions of the wave. The resultant magnetic field which is established by the three windings of the instrument 147 is proportional to the relative amplitudes of the sampled voltages applied to the two energized windings. The relative amplitudes of the voltages applied to these two windings can vary in both amplitude and polarity as the alternating current output from modulator 131 shifts with respect to the sampling pulses. Thus, the end result is to provide an instrument whose rotor aligns itself with the resultant field, which field can occupy any position from zero to 360 degrees.

The system disclosed in FIG. 3 receives, on its input terminals, voltages which represent positions and directions of the aircraft with respect to a selected ground station. Many of these indications are predetermined by the mission being simulated or by the instructor, and others are generated within the flight computer of the aircraft simulator itself. The system shown in FIG. 3 utilizes these voltages to develop a meter indication which correctly indicates direction and realistically simulates the operation of an ADF system. A student pilot or trainee utilizing a simulator in which this system is corporated should receive the same stimulation that he would get from the actual operational equipment in the aircraft itself.

Figure 4:
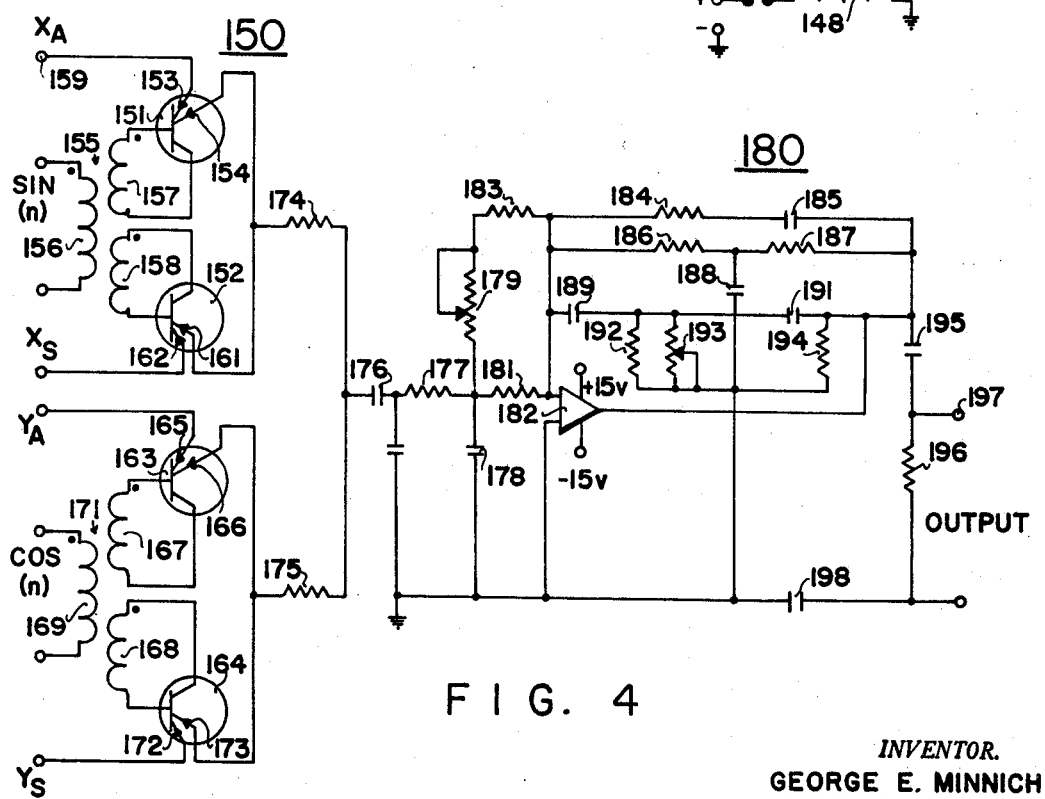
FIG. 4 is a schematic circuit diagram of a pulse modulator and filter used in the systems of FIGS. 1 and 3.

In the apparatus shown in FIGS. 1 and 3, several dual modulator and filter circuits have been used. FIG. 4 is a schematic wiring diagram of a typical modulator and filter circuit such as that designated by the reference character 121 in FIG. 3. The device of FIG. 4 comprises two major portions, a modulator portion designated generally at 150 and a filter portion designated generally as 180. The modulator 150 comprises two separate pairs of transistor switches. A first pair comprises a transistor 151 which includes two separate emitter electrodes 153 and 154, and a second transistor 152 which includes two separate emitter electrodes 161 and 162. The base electrode of the transistor 151 is connected to one side of a transformer secondary 157, to the other side of which is connected the collector electrode. Similarly, the base electrode of the transistor 152 is connected to one side of a transformer secondary 158, to the other side of which is connected the collector electrode. The two secondaries 157 and 158 form part of a transformer 155 which also includes a primary winding 156. The reference control signal sin $(n)$ is applied to the primary winding 156. As shown in FIG. 3 the modulator 121 has applied to it, in addition to the control signals, voltages which represent the X and Y coordinates of the aircraft and the ground station being simulated. The same type of information will be used to illustrate the construction and operation of the modulator shown in detail in FIG. 4. The voltage which represents the X coordinate of the aircraft is applied to an input terminal 159 which is connected to the emitter electrode 153. The other emitter electrode 154 provides an output from the transistor 151 and is connected through a resistor 174 and a capacitor 176 to the filter 180. The voltage which represent the X coordinate of the ground station is applied to an input terminal which is connected to the emitter electrode 162 of the transistor 152. The other emitter electrode 161 of the transistor 152 also provides an output from that transistor and is connected to the junction of the emitter 154 and the resistor 174.

The other half of the modulator 150 is identical to that described and comprises two transistors 163 and 164. The transistor 163 includes a base electrode which is connected to one side of a secondary winding 167 to the other side of which is connected the collector electrode. The transistor 163 also includes two emitter electrodes 165 and 166. The transistor 164 includes a base electrode connected to one side of a secondary winding 168 and a collector electrode connected to the other side of the same winding. Also included in the transistor 164 are two emitter electrodes 172 and 173. The two secondary windings 167 and 168 form part of a transformer 171 which includes a primary winding 169 to which is connected the quadrature control signal cosine $(n)$. The voltage representing the Y coordinate of the aircraft is applied to the emitter electrode 165 of the transistor 163, and the voltage representing the Y coordinate of the ground station is connected to the emitter electrode 172 of the transistor 164. The other two emitter electrodes 166 and 173 are connected together and through a resistor 175 and the capacitor 176 to the filter 180.

In operation, considering first the upper portion of the modulator 150, the control voltage applied to the primary winding 156 is applied to the two base electrodes in opposite polarities. This is because the upper portion of the winding 157 and the lower portion of the winding 158 are connected to the respective base electrodes of the two transistors 151 and 152 and they are of opposite polarity. Therefore, for each half cycle of the input control signal, one of the two transistors 151 or 152 will be conductive. When that transistor conducts, its two emitter electrodes are connected together. During one-half cycle of the input control signals applied to the winding 156, transistor 151 will conduct and connect the voltage representing the X coordinate of the aircraft through the resistor 174 and the capacitor 176. During the other half of the cycle of the control signal applied to the winding 156, the transistor 152 conducts and applies the X coordinate of the ground station through the resistor 174 and the capacitor 176. Thus, the output of the top portion of the modulator 150 comprises two pulses immediately following each other, each pulse having the same width and having an amplitude which is proportional to either the X coordinate of the aircraft or that of the ground station. In a similar manner, the two transistors 163 and 164 of the lower half of the modulator 150 are also rendered alternately conductive. When the transistor 163 conducts, the Y coordinate of the aircraft is applied through the resistor 175 to the capacitor 176, and on the other half cycle the transistor 162 conducts and applies the voltage representing the Y coordinate of the ground station through the resistor 175 to the capacitor 176.

The control signals applied to the upper half and the lower half of the modulator 150 through the windings 156 and 169 and 90 degrees out of phase. Thus, for 90 degrees the X and the Y coordinates of the aircraft are simultaneously applied to the capacitor 176. During the following 90 degrees the X coordinate of the ground station and the Y coordinate of the aircraft are simultaneously applied to the capacitor 176. Then, during the third 90 degrees of the cycle, the X coordinate of the ground station and the Y coordinate of the ground station are simultaneously applied to the capacitor 176, and during the fourth quater cycle the X of the aircraft and the Y coordinate of the ground station are simultaneously applied to the capacitor 176. The resultant potential appearing across the capacitor 176 at any time depends upon the amplitude and polarity of the potential being conducted by the transistors in the modulator at that time. Thus, the resultant output which is applied through a resistor 177 and appears across a capacitor 178 to the filter circuit 180 has an amplitude which is proportional to the range, or distance, of the aircraft from the ground station, and whose cross-over points, or phase, is proportional to the angular relationship of the two sets of coordinates. Since the amplitudes of any of the potentials applied to the emitter electrodes representative of either the X or the Y coordinates of either the aircraft or the ground station can vary substantially in amplitude and can be of either positive or negative polarities, the resultant voltage of the charge on the capacitor 176 will depend upon both the amplitude and the polarity of the individual pulses.

The second part of the modulator and filter circuit is the filter 180. This filter utilizes an operational amplifier together with time constant circuit parameters which provide the filtering operation. The filter portion 180 as shown in FIG. 4 is a low-pass filter of the same general type shown in detail and described in "Applications Manual for Computing Amplifiers for Modelling, Measuring, Manipulating, and Much Else," published by Philbrick Researches, Inc., pp. 74 and 75. To remove a requirement for a large and expensive filter, the control signals applied to the input primary windings 156 and 169 are notched square waves as mentioned above. Since the phasing of the input and output signals is important to the proper operation of these circuits, square waves are used because their cross-over points are clearly defined. Square waves contain all odd harmonics. Actually, only the fundamental is of interest in this application. The two harmonics which are particularly strong and which require the most filtering are the third harmonic and the fifth harmonic. The square wave which is applied to the primary windings 156 and 169 have removed from them the third and the fifth harmonic. The removal of these harmonics results in a notched or multilated wave. The derivation of the properly notched square wave can be accomplished in any of several ways. One way which is useful in this connection is the development of the fundamental square wave from a fairly high frequency multivibrator whose output is applied through successive stages of binary counters. In this manner the fundamental and the desired odd harmonics are also produced, and the third and fifth harmonics can be readily subtracted from the final production of the fundamental wave. By removing the third and fifth harmonic from the harmonic content of the square wave which is used, the strongest harmonic remaining is the seventh, and this one is relatively weak. For this reason the short filter shown in FIG. 4 is effective to produce the output sine wave which is required for the proper operation of the equipment.

The above specification has described a new and improved apparatus for accurately and simply simulating the normal navigational radio aids found in modern aircraft. It is realized that a reading of the above specification may indicate to those skilled in the art additional ways in which this invention may be utilized without departing from its principles. It is, therefore, intended that this invention be limited only by the scope of the appended claims.

What is claimed is:

1. A system for simulating aircraft radio navigation equipment, said system including a first means for simulating omnirange equipment, a second means for simulating instrument landing equipment and a third means for simulating automatic direction finding equipment; said first and second means comprising a fourth means for receiving information representing the orientation angle from North to a radial from a simulated airfield to a simulated aircraft and for generating a sinusoidal output signal whose phase with respect to a reference is proportional to said orientation angle; fifth means for receiving information representing the coordinates of said simulated airfield and the coordinates of said simulated aircraft and for generating therefrom a sinusoidal output signal whose phase is that of a reference and whose amplitude is proportional to the distance of said simulated aircraft from said simulated airfield; said first means further including sixth means for modifying the phase relation of the output of said fourth means with respect to the output of said fifth means; a first indicating instrument for showing the orientation of the simulated aircraft with respect to said simulated airfield, and a first phase comparator whose output is connected to said first indicating instrument and whose inputs are connected to the ouput from said phase modifying and to the output from said fifth means to produce for said first instrument a signal which is proportional to the phase difference between the outputs from said fourth and fifth means.

2. The system defined in claim 1 wherein said sixth means comprises a phase splitter for dividing the output signal from said fourth means into a plurality of signals whose relative phase angles are equally distributed through 360°, a generally circular resistor having a plurality of input terminals spaced equally around the periphery of said resistor, means for applying individual ones of said plurality of signals to individual ones of said plurality of input terminals, and a movable contact on said resistor for deriving a signal whose phase is the resultant of the phases of the applied signals and the position of said movable contact.

3. The system defined in claim 1 further including a second indicating instrument, a quadrature phase shifter having its input connected to the output from said sixth means, a second phase comparator having its inputs connected to said phase shifter and to the output from said fifth means, and means for connecting the output from said second phase comparator to said second indicating instrument whereby said second indicating instrument indicates when the simulated aircraft is approaching and when it is leaving the simulated airfield.

4. The system defined in claim 1 wherein said second means further includes a voltage summing device, means for connecting the output from said fifth means and the output from said fourth means to the inputs of said summing device, a third indicating instrument for showing when the simulated aircraft is receiving signals from a simulated glide slope transmitter, and means for connecting the output from said voltage summing device to the input of said third instrument.

5. The system defined in claim 1 wherein said fifth means comprises a third and a fourth modulator, means for applying to said third modulator input information relating to one coordinate of said simulated airfield and said simulated aircraft and a reference rectangular control signal, and means for applying to the inputs of said fourth modulator information relating to another coordinate of said simulated airfield and said simulated aircraft and a quadrature rectangular control signal, said third and fourth modulators operating to modulate said coordinate information by said control signals.

6. The system defined in claim 5 further including a second indicating instrument, a quadrature phase shifter having its input connected to the output of said sixth means, a second phase comparator having its inputs connected to said phase shifter and to the outputs from said third and fourth modulators, and means for connecting the output from said second phase comparator to said second instrument whereby said second instrument indicates when the simulated aircraft is approaching and when it is leaving the simulated airfield.

7. The system defined in claim 1 wherein said second means further includes a fourth indicating instrument for displaying deviations from a simulated glide slope, seventh means for receiving information representative of the altitudes of said simulated airfield and simulated aircraft and the output from said summing device and for generating a sinusoidal output signal whose amplitude is proportional to the slope of a simulated glide path, and means for connecting the output from said seventh means to said fourth instrument.

8. The system defined in claim 7 further including a differential device, means for applying to the input of said differential device information representative of the maximum range of selected simulated ground transmitters and also the output from said fifth means which represents the distance of said simulated aircraft from the simulated airfield, the output from said differential device being a signal which indicates when the simulated aircraft is within said transmitter range, and means interposed before said first, third and fourth instruments and responsive to said signal from said differential device to interrupt the flow of information to said instruments when said signal is not present.

9. The system defined in claim 1 wherein said third means comprises an eighth means for receiving information representative of the coordinates of a simulated airfield and a simulated aircraft and for generating a sinusoidal output signal whose phase with respect to a reference is proportional to the bearing angle of the aircraft with respect to the airfield, ninth means for receiving information representative of the bearing angle of said simulated aircraft with respect to North and the output from said eighth means and for generating a sinusoidal output signal whose phase with respect to a reference is proportional to the difference between the simulated aircraft bearing angle with respect to North and the bearing from the aircraft to the simulated airfield, a fifth indicating instrument, and means for applying to said fifth instrument the output from said ninth means to indicate the direction from said simulated aircraft to said simulated airfield.

10. The system defined in claim 9 wherein said eighth means comprises fifth and sixth modulators, said fifth modulator having means for receiving voltages proportional to one coordinate of said simulated airfield and simulated aircraft and a reference rectangular control signal, and said sixth modulator having means for receiving voltages proportional to another coordinate of the simulated airfield and simulated aircraft and of a quadrature rectangular control signal, said fifth and sixth modulators operating to modulate said coordinate voltages by said control voltages.

11. The system defined in claim 9 wherein said ninth means comprises seventh and eighth modulators, said seventh modulator having means for receiving information proportional to the sine of the simulated aircraft bearing angle with respect to North and the direct output from said eighth means, said eighth modulator comprising means for receiving the cosine of the simulated aircraft angle with respect to North, a ninety degree phase shifter, and means for connecting the ninety degree phase shifter between the output from said eighth means and an input to said eighth modulator, said seventh and eighth modulators operating to modulate the bearing angle information by said outputs from said eighth means.

12. The system defined in claim 9 wherein said means for applying the output from said ninth means to said fifth instrument includes two paths, means in each of said two paths for periodically sampling the output from said ninth means and for holding the sampled potential, means for applying to one of said two sampling means a first sampling potential which occurs at a first time, means for applying to the other of said two sampling means a second sampling potential which occurs at a second time, and means for applying the sampled potentials from said two sampling means to said fifth instrument.

13. The system defined in claim 10 wherein said fifth instrument comprises a plurality of field windings equally distributed around the instrument and a permanent magnet rotor, and wherein said means for applying the sampled potentials from said two sampling means to said fifth instrument includes means for applying the output from one of said sampling means to one of said windings and the output from the other of said sampling means to another of said windings whereby the rotor of said fifth instrument aligns itself with the resultant magnetic field throughout a full 360° of rotation.

14. The system defined in claim 1 wherein said fourth means comprises a first and a second modulator, means to apply to the input of said first modulator information proportional to the sine of said orientation angle and a rectangular reference control signal, and means for applying to the input of said second modulator information proportional to the cosine of said orientation angle and a quadrature rectangular control signal, said first and second modulators operating to modulate said angular information by said control signals.

15. The system defined in claim 14 further including a second indicating instrument, a quadrature phase shifter having its input connected to the output from said sixth means, a second phase comparator having its inputs connected to said phase shifter and to the output from said fifth means, and means for connecting the output from said second phase comparator to said second indicating instrument whereby said second instrument indicates when the simulated aircraft is approaching and when it is leaving the simulated airfield.

16. The system defined in claim 14 wherein said fith means comprises a third and a fourth modulator, means for applying to said third modulator inputs information relating to one coordinate of said simulated airfield and said simulated aircraft and a reference rectangular control signal, and means for applying to the inputs of said fourth modulator information relating to another coordinate of said simulated airfield and said simulated aircraft and a quadrature rectangular control signal, said third and fourth modulators operating to modulate said coordinate information by said control signals.

17. The sytsem defined in claim 16 wherein said second means further includes a voltage summing device; means for connecting the output from said first, second, third and fourth modulators to the inputs of said voltage summing device; a third indicating instrument for showing when the simulated aircraft is receiving signals from a simulated glide slope transmitter; and means for connecting the output from said voltage summing device to the input of said third instrument.

18. The system defined in claim 16 wherein said second means further includes a fourth indicating instrument for displaying deviations from a simulated glide path, seventh means for receiving information representative of the altitudes of said simulated aircraft and airfield and the output from said voltage summing device and for generating a sinusoidal output signal whose amplitude is proportional to the slope of a simulated glide path, and means for connecting the output from said seventh means to said fourth instrument.

References Cited

UNITED STATES PATENTS

| | | | |
|---|---|---|---|
| Re. 23,627 | 3/1953 | Dehmel | 35—10.2 |
| 2,529,468 | 11/1950 | Dehmel | 35—10.2 |
| 2,612,638 | 9/1952 | Pine | 35—10.2 |
| 2,715,782 | 8/1955 | Cooper et al. | 35—10.2 |
| 2,809,444 | 10/1957 | Woods et al. | 35—10.2 |
| 2,947,088 | 8/1960 | Zahner et al, | 35—10.2 |
| 3,299,197 | 1/1967 | Cutler | 35—10.2 |
| 3,358,284 | 12/1967 | Millar et al. | 343—106 |

MALCOLM A. MORRISON, Primary Examiner

ROBERT W. WEIG, Assistant Examiner

U.S. Cl. X.R.

35—12, 10.4